(12) United States Patent
Roemke et al.

(10) Patent No.: US 7,054,869 B1
(45) Date of Patent: May 30, 2006

(54) METHODS AND SYSTEMS FOR FACILITATING THE PRODUCTION AND DISTRIBUTION OF CONTENT

(75) Inventors: Edward Roemke, Avon, CT (US); James Hodson, New Britain, CT (US)

(73) Assignee: Insworld, Inc., Avon, CT (US)

( * ) Notice: Subject to any disclaimer, the term of this patent is extended or adjusted under 35 U.S.C. 154(b) by 165 days.

(21) Appl. No.: 10/744,532

(22) Filed: Dec. 22, 2003

(51) Int. Cl.
*G06F 17/30* (2006.01)

(52) U.S. Cl. .................. 707/10; 707/104.1; 709/207; 709/225; 715/517; 726/27

(58) Field of Classification Search .................. 707/10, 707/103 X, 203, 103 R, 104.1; 709/207, 709/225, 206; 715/515, 517; 705/28, 34; 726/27
See application file for complete search history.

(56) References Cited

U.S. PATENT DOCUMENTS

| | | | | |
|---|---|---|---|---|
| 6,026,417 A | * | 2/2000 | Ross et al. | 715/517 |
| 6,356,903 B1 | * | 3/2002 | Baxter et al. | 707/10 |
| 6,539,403 B1 | | 3/2003 | Cho et al. | 707/203 |
| 6,643,652 B1 | * | 11/2003 | Helgeson et al. | 707/10 |
| 6,981,281 B1 | * | 12/2005 | LaMacchia et al. | 726/27 |
| 2002/0087576 A1 | * | 7/2002 | Geiger et al. | 707/104.1 |
| 2003/0088634 A1 | * | 5/2003 | Friedman | 709/207 |
| 2005/0138044 A1 | | 6/2005 | Roemke et al. | |

FOREIGN PATENT DOCUMENTS

WO    WO-05065174 A2    7/2005

OTHER PUBLICATIONS

INSWORLD.COM, et al., "International Search Report", *PCT/US2004/41939*, (Oct. 24, 2005), 11 pages.

* cited by examiner

*Primary Examiner*—Shahid Alam
(74) *Attorney, Agent, or Firm*—JLB Consulting, Inc.; Jeffrey L. Brandt

(57) ABSTRACT

A hierarchically arranged content assembly and distribution system includes global and local administrators, the global administrators having the authorization to establish the local administrators. Global administrators have the ability to establish global content, establish global subscriber lists and assemble content for distribution to the global subscribers. Local administrators have the ability to establish local content, establish local subscriber lists and to assemble content selected from both the global and local content for distribution to local subscribers. Each local administrator thus has the ability to utilize both local content as well as content provided by the hierarchy of other administrators in order to assemble content.

7 Claims, 6 Drawing Sheets

METHODS AND SYSTEMS FOR FACILITATING THE PRODUCTION AND DISTRIBUTION OF CONTENT

CROSS-REFERENCE TO RELATED CO-PENDING APPLICATIONS

This application is related to co-pending U.S. patent application Ser. No. 10/744,304, titled: METHODS AND SYSTEMS FOR CREATING AND OPERATING HIERARCHICAL LEVELS OF ADMINISTRATORS TO FACILITATE THE PRODUCTION AND DISTRIBUTION OF CONTENT, by inventors Roemke, E. and Hodson, J., filed on same date herewith, the entirety of which is incorporated herein by reference.

FIELD OF THE INVENTION

The present invention relates generally to the publication of content and more specifically to the management, assembly and distribution of content on an electronic network.

BACKGROUND OF THE INVENTION

Many different businesses use newsletters as a means of communicating with their customers. Newsletters may be periodic in nature, for example monthly or quarterly, or released upon the occurrence of a particular event of interest. Such newsletters provide businesses with an opportunity to stay in touch with, market to and provide current and useful information to existing customers.

In fact, it has been estimated that in the calendar year 2005, U.S, businesses will spend approximately $7.3 billion (U.S.) on the generation and distribution of electronic newsletters.

Many different processes exist for the creation and distribution of newsletters. Traditionally newsletters were created by hand, for example through typing, reproduced using presses or other electromechanical reproduction equipment and mailed by postal service to recipients. More recently, computers are being used extensively in the creation of newsletters. For example, U.S. Pat. No. 6,026,417 to Ross et al. shows a desktop publishing system that enables a user to change the format of a publication without re-entering content information. U.S. Pat. No. 6,356,903 B1 to Baxter et al. shows systems and methods for organizing and presenting content from a variety of sources in a unified format.

In addition to the use of computers to create newsletters, alternative electronic methods of distribution have become available for the transmission of newsletters. Newsletters today may be distributed electronically, through private networks and/or through public networks such as the Internet. Electronically distributed newsletters may be communicated in a variety of ways, for example by posting for readers to view or by electronic mailing to recipient electronic mail (email) addresses. See, for example, published U.S. patent application 2003/00886334/A1 to Friedman showing methods and systems for generating and distributing electronic newsletters and ezines based upon viewer interest. Other methods of distribution include facsimile machines and portable electronic equipment such as portable digital assistants (PDAS) and even mobile telephones.

Despite advances afforded through the use of computers, the assembly and distribution of newsletters and similar content communications between businesses and customers still presents a process ripe with challenges. Initially, there is the challenge of collecting content of interest. Content collection is expensive and time-consuming. Following the collection of content, there is the challenge of selecting and assembling content of interest for particular recipients. Different customer sets likely have different interests. Even after content is identified and assembled, transmitting the newsletter to customers requires the assembly and ongoing maintenance of customer distribution information, for example mailing addresses, email addresses, facsimile telephone numbers and other customer contact information.

There thus exists the need for methods and systems that facilitate the creation and distribution of content, for example of newsletters by businesses for distribution to customers. Such methods and systems would desirably facilitate and simplify the process of content creation, content assembly and distribution to recipients.

SUMMARY OF THE INVENTION

The present invention provides new and improved methods and systems for the production and distribution of communications, for example of newsletters distributed by businesses to customers. In accordance with the present invention, content is assembled in a hierarchical process, the participants at each level of the hierarchy able to select from existing content established and assigned to be available at higher levels in the hierarchy, add new content and manage the distribution of the assembled content to selected customers.

In accordance with one embodiment of the invention there are provided methods and systems for assembling communications for distribution to subscribers, one method comprising the steps of: establishing at least one level one administrator with the authorizations to establish a plurality of level two administrators, establish a plurality of level one content items, and identify from the plurality of level one content items distributed level one content items for distribution to level two administrators; and establishing, by the one level one administrator, at least one level two administrator, with the authorizations to establish a group of level two subscribers, establish a plurality of level two content items, and select from the plurality of level two content items and the distributed level one content items to assemble a communication for distribution to the level two subscribers.

In accordance with another embodiment of the invention there are provided methods and systems to establish a network of operators for assembling communications, one method comprising the steps of: identifying at least one level one administrator; and granting to the level one administrator the authorizations to establish at least one level two administrator, establish a plurality of level one content items, and identify from the plurality of level one content items at least one restricted level one content item for use by the level one administrator in assembling a first communication and at least one distributed level one content item for use by the level two administrator in assembling a second communication.

In accordance with yet another embodiment of the invention there are provided methods and systems for establishing a network of geographically diverse administrators to assemble and distribute communications to geographically diverse customers sharing a common business interest, one method comprising the steps of: establishing a first plurality of global administrators authorized to establish a plurality of content items including first restricted content items for local use and first distributed content items for use by others; establishing a second plurality of global administrators authorized to establish a plurality of content items including second restricted content items for local use, the first distributed content items for use by others and second distributed content items for use by others; establishing a plurality of local administrators authorized to establish a list of subscribers and to establish a plurality of third restricted content items for local use; enabling the second plurality of global administrators to identify from the first distributed content items and the second distributed content items identified distributed content items for use by the local administrators whereby the local administrators have access to the third restricted content items and the identified distributed content items for assembling communications; and enabling the local administrators to assemble communications for distribution to the subscribers.

The present invention provides many advantages over the prior art, including the abilities to: easily add and share content of interest to both distributors and subscribers; maintain at a local level subscriber information including subscriber distribution information; select, edit and assemble at a local level content items of particular interest to local subscribers; and administer distributor and subscriber functionality at global and local levels.

BRIEF DESCRIPTION OF THE DRAWING FEATURES

These and other objects, features and advantages of the present invention will be apparent from a reading of the detailed description of the invention when considered with the drawing Figures, in which.

DETAILED DESCRIPTION OF THE INVENTION

There will now be provided publication management systems and methods that enable the fast and cost-effective assembly of shared content, in a hierarchical environment, into various communications for transmission to subscribers.

As used herein, the term 'content' and variants thereof include all media that is communicable to and understandable by a recipient. Content thus includes but is not limited to: text, graphics, audio, video and other human-perceptible communications. As described herein, content is delivered to recipients in an electronic communication. However, the invention is not thus limited but contemplates all methods of delivery including but not limited to: hardcopy, audio transmissions, video transmissions, electronic distribution as described and all other transmission formats perceptible to recipients, typically but not limited to human recipients.

Figure 1:
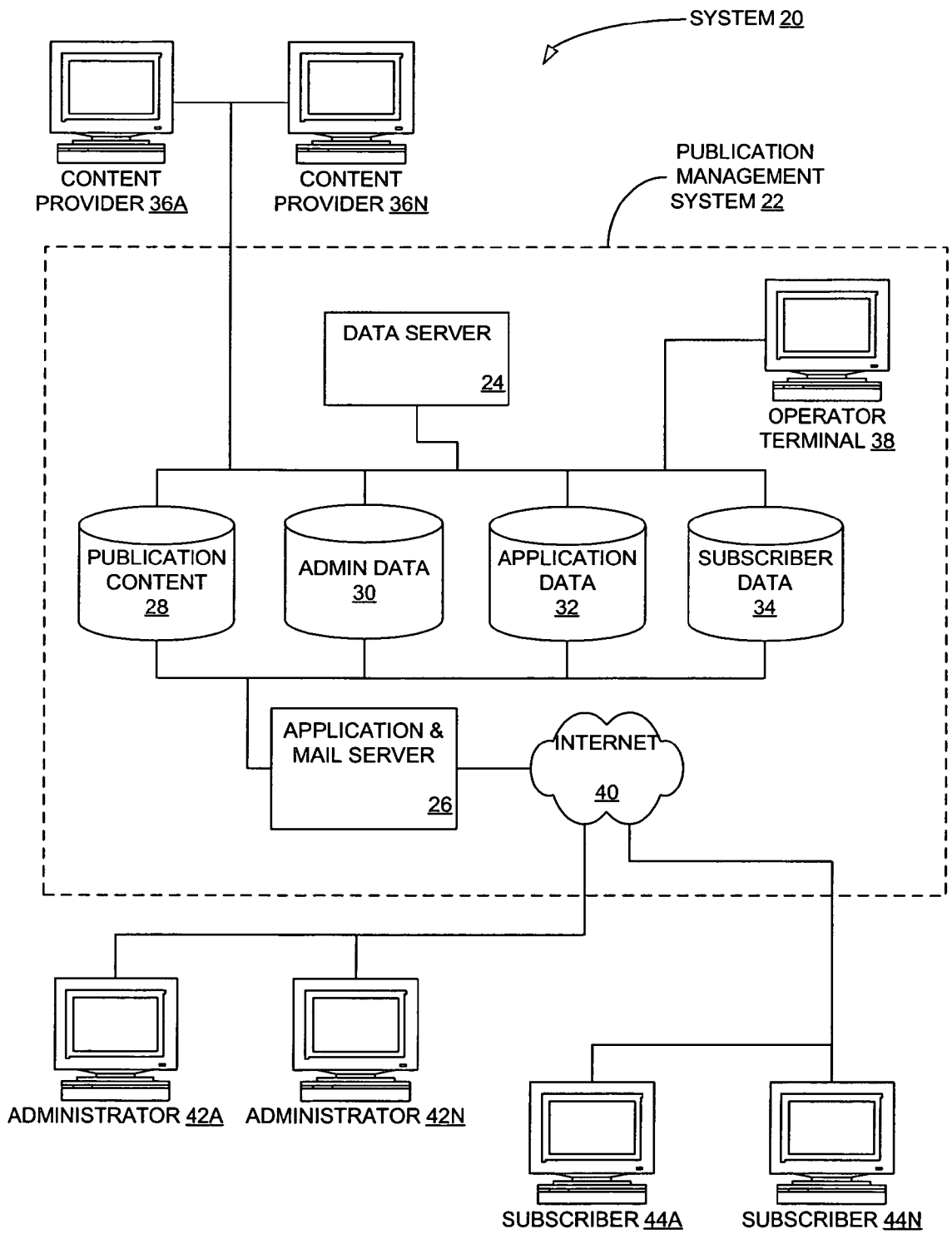
FIG. 1 is a block diagram of a publication management system in accordance with the invention.

With reference now to FIG. 1, there is shown a system 20 including a publication management system 22 comprising a data server 24 and an application & mail server 26. Connected to each of data server 24 and application & mail server 26 are databases including a publication content database 28, an administrative database 30, an application database 32 and a subscriber database 34. A plurality of content providers, indicated at 36A–36N, are connected to publication management system 22 in a manner enabling the transmission of content into publication content database 28, for example directly or through an appropriate electronic network. An operator interface, for example in the form of a user terminal 38, is connected to publication management system to facilitate the operation of the system.

Continuing with reference to FIG. 1, application server 26 is connected in a conventional manner to a public network, for example the Internet 40. A plurality of administrators 42A–42N and subscribers 44A–44N, the identities and functions of which are described in detail below, are connected to publication management system 22 through Internet 40.

In operation, the details of which are described below, publication management system 22 receives content from content providers 36A–36N for management by administrators 42A–42N and distribution to subscribers 44A–44N. The databases 28, 30, 32, 34 are managed by data server 24, publication content database 28 storing content, administration database 30 storing administrative data including administrative authorizations described below, application database 32 storing instructions to operate system 22 as described below and subscriber database 34 storing communications recipient data including address data. Application & mail server 26 functions as the interface between administrators 42A–42N, subscribers 44A–44N and publication management system 22.

It will be understood that the hardware and software components of publication management system 22 comprise conventional computer components connected and programmed to operate in accordance with the present invention as described herein. In one embodiment, data server 24 and application mail server 26 each comprise a Wintel-compatible computer system running Windows 2000®Server. The various databases 28, 30, 32 and 34 comprise Sequel Server 2000® databases stored in a conventional storage system comprising an appropriate combination of semiconductor, magnetic and optical memory. Numerous other configurations of system 22 operative to perform the present invention will now be apparent to the reader.

Figure 2:
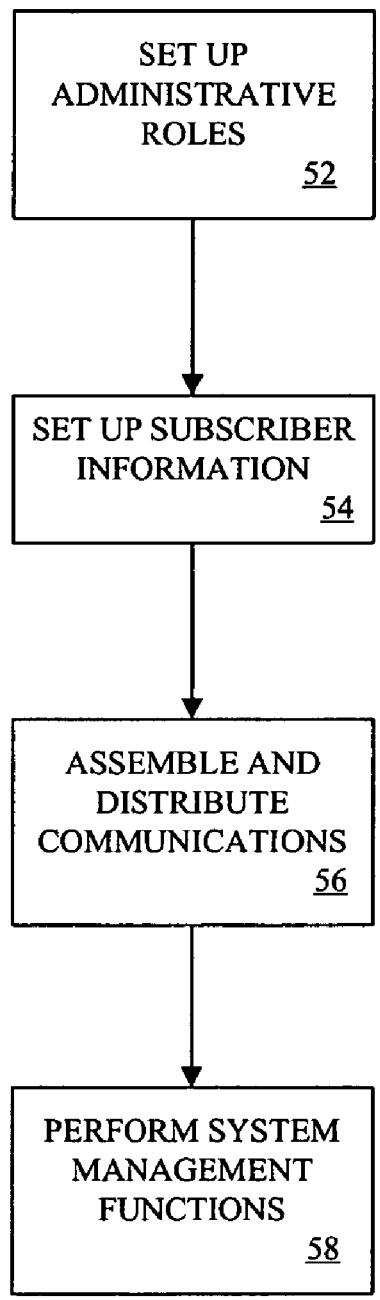
FIG. 2 is a flow chart illustrating an overview of the operation of the system of FIG. 1.

With reference now to FIG. 2, an overview 50 of the operation of the invention is shown wherein initially administrative roles are established (step 52). As described in detail below, the establishment of administrative roles includes establishing a hierarchical distribution of global, or 'level one' administrators and local, or 'level two' administrators. A super administrator may be established to in turn establish the global administrators. Likewise, global administrators may establish both other global administrators as well as local administrators. In addition to the above-described authorizations to establish administrators granted to the super and global administrators, each of the various administrators is granted, based on their level, a group of other authorizations on publication management system 22, enabling them to perform necessary functions.

More particularly, the super administrator and global administrators each have the authority to select content for distribution to other global administrators and to local administrators. Each of the super administrator, global administrators and local administrators have the authority to establish local lists of subscribers and to assemble communications and distribute communications to their subscribers. Local administrators are not authorized to establish any other type of administrator. As used herein, a "subscriber" and variants thereon are recipients of communications. Subscribers may actively subscribe to receive communications or may be selected by an administrator to receive communications.

Continuing with reference to FIG. 2, once established, administrators set up local subscriber information (step 54) including sufficient details as are necessary to transmit communications to subscribers, for example email addresses if communications are to be transmitted by electronic networks. Many different methods and systems are known for collecting and managing such data, including in one embodiment the use of the Microsoft Excel® spreadsheet program.

Administrators assemble and distribute communications (step 56) to subscribers in the manner described in detail below. Administrators also perform necessary system maintenance and management (step 58), pertinent examples of which are described herein.

Figure 3:
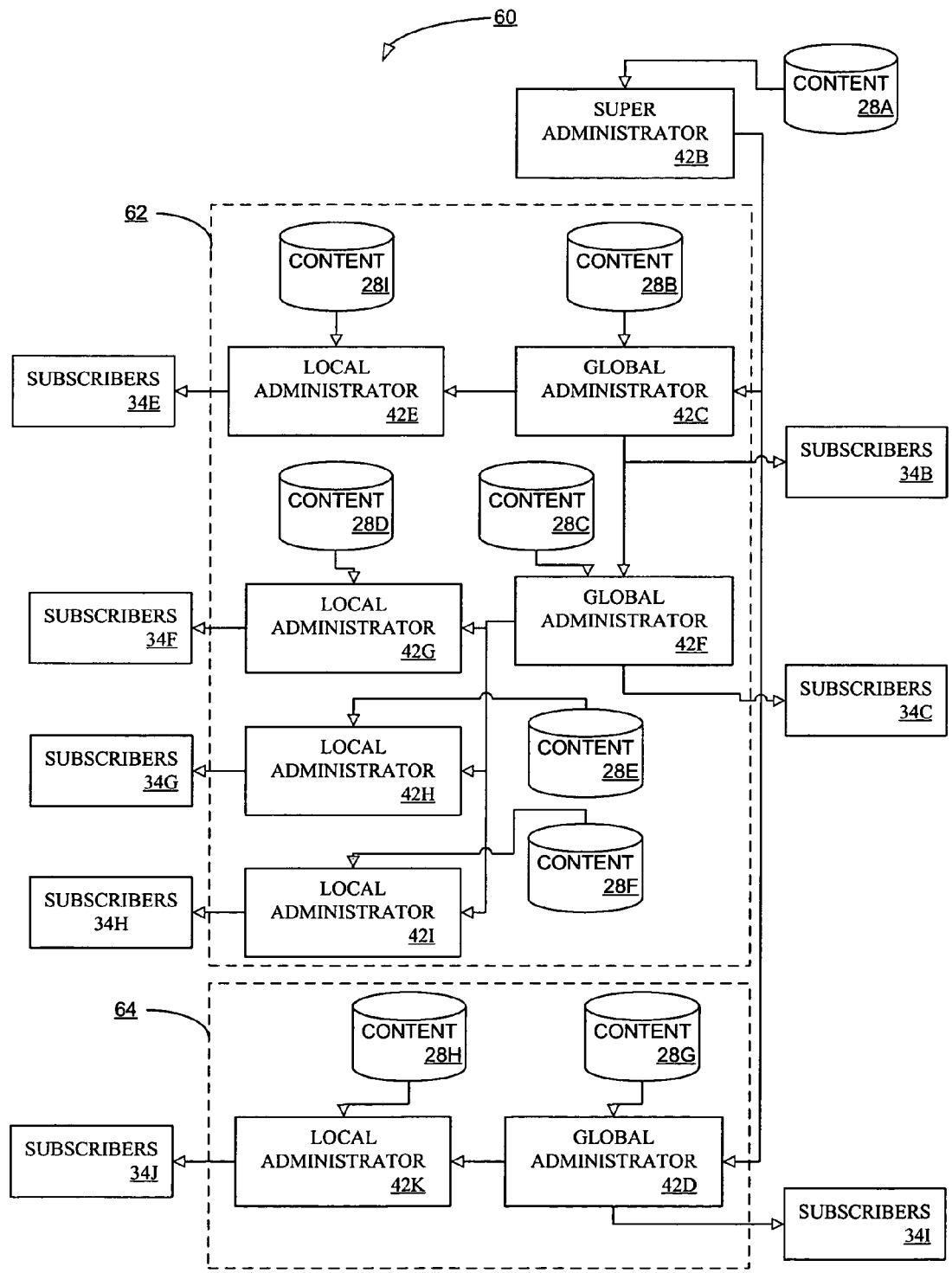
FIG. 3 is a block diagram showing the functional interaction between administrators, content and publications in accordance with the present invention.

With reference now to FIG. 3, the hierarchical relationship and interaction of administrators and subscribers is shown in block diagram 60, including a super administrator 42B associated with the operation of publication management system 22 (FIG. 1). Various other administrators, described below, are associated with a first entity 62 and a second entity 64. Entities 62 and 64 may comprise, for example, companies who are clients, procuring the services of publication management system 22. For purposes of explanation, it will be understood that all references to content in FIG. 3 comprise content available from publication content database 28 in publication management system 22 and are appropriately numbered. As described in detail below, the content may, in various instances, be imported from $3^{rd}$-party sources, created locally and/or received by assignment from an administrator. All references to administrators comprise various administrators as show at 42A–42N and are appropriately numbered. All references to subscriber lists comprise subscriber sets from subscriber database 34 and are also appropriately numbered. As described below, subscriber lists are typically created and maintained locally for use by an administrator.

As used here, the term 'locally' and variants thereof is indicative of a function performed directly by a party under discussion, typically an administrator, as opposed to a function performed by another. 'Local' is not indicative of a geographic location. As is well known in the art, computer networking technology generally enables any user of a system to work from any geographical location.

Continuing with reference to FIG. 3, super administrators such as 42B are noted above to have certain authorizations in accordance with the present invention, including the authorizations to: i) establish global administrators, ii) establish content in publication content database 28, iii) select content from database 28 for assembly and communication to global and local administrators, iv) establish subscriber lists for global and/or local administrators, and v) perform certain administrative functions with respect to publication management system 22 such as a) setting up customer-companies to use the system and b) establishing one or more global administrators within each newly established company. In the described embodiment, super administrators are associated directly with the ownership and operation of publication management system 22 and do not establish their own subscriber lists.

As shown in FIG. 3, super administrator 42B has established a global administrator 42C within entity 62 and a global administrator 42D within entity 64. As noted above, global administrators have certain authorizations in accordance with the present invention, including the authorizations to: i) establish other global administrators, ii) establish local administrators, iii) establish subscriber lists, iv) establish content in publication content database 28, v) select content from database 28 for assembly and communication to subscribers, vi) add subscribers to local administrator subscriber lists, and vii) select content from accessible content to assign and thereby make available to other global administrators and to local administrators. Global administrator 42C has access to content 28B and has established a local administrator 42E and another global administrator 42F. Global administrator 42C has also established a subscriber list 34B.

Within entity 62, global administrator 42F has established three local administrators indicated at 42G, 42H and 42I. As noted above, local administrators have authorizations to i) establish subscriber lists, ii) establish content in publication content database 28, iii) select content from established content for assembly and communication to subscribers, and iv) select content from content assigned by higher-level super and global administrators to make available to local administrators for assembly and communication to subscribers. In comparison to global administrators, local administrators may only access content established by them and content to which access has been granted by one or more super or global administrators. Local administrators do not have access to broader ranges of content in publication content database 28. Neither do local administrators have authorization to establish other administrators.

It will be understood that, as used herein, the phrases 'establish content' and 'have access to content' and variants thereon are used to describe three methods of accessing content: i) the actual creation of content, for example the drafting of a text article, ii) accessing content assigned by higher-level administrators, and iii) the procurement of content from a content provider 36A–36N. The phrase 'establish a [global or local] administrator' and variants thereon are used to describe the process of creating on publication management system 22 a computer user identity with the appropriate administrator authorizations, accesses and permissions as described herein.

Continuing with reference to FIG. 3 and particularly within entity 62, global administrator 42F is seen to have access to content 28C and have created subscriber list 34C. Local administrator 42E is seen to have access to content 28I and to have created subscriber list 34E. Local administrators 42G, 42H and 42I are seen to have access to content 28D, 28E and 28F, respectively, and to have created subscriber lists 34F, 34G and 34H, respectively.

Within entity 64, global administrator 42D is seen to have established one local administrator 42K and to have access to content 28G to assemble communications for distribution to subscribers 34I. Local administrator 42K is seen to have access to content 28H to assemble communications for distribution to subscribers 34J.

Figure 4:
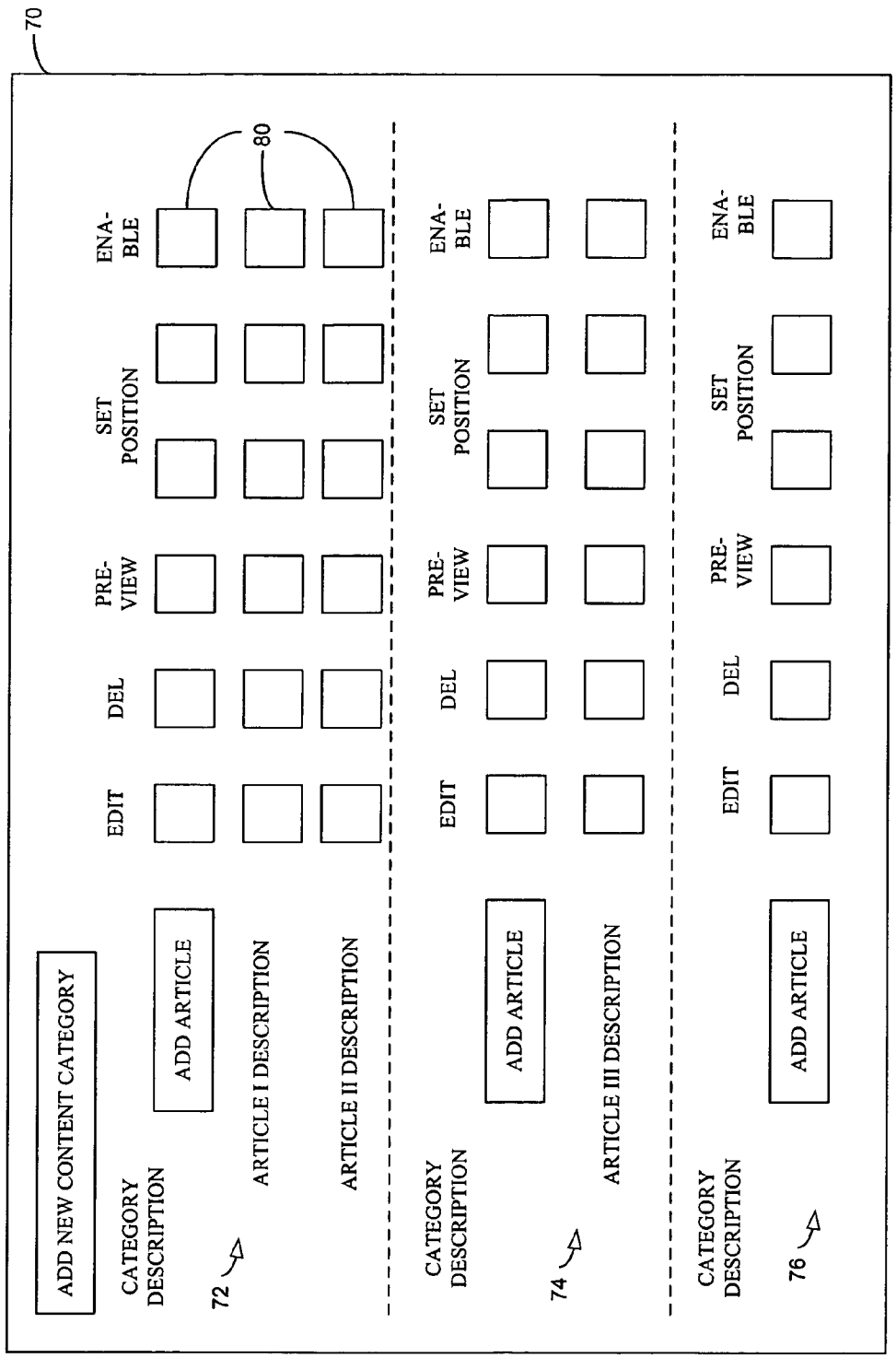
FIG. 4 is a block diagram illustrating the creation of content collections such as newsletters in accordance with the present invention.

With reference now to FIG. 4, a console 70, or operator screen, is shown of the type used by super, global and local administrators to manage content. Console 70, typically displayed on a computer terminal of the type used by an administrator, displays multiple categories of manageable content, three of which are shown for purposes of explanation at 72, 74 and 76. It will be seen that the category areas 72, 74, 76 are separated by dashed lines. It will be understood that any number of content categories may be displayed as will fit on one screen of the terminal displaying console 70, with multiple screens or pages used to display more content category areas and more articles.

Within each content category area 72, 74, 76 is displayed a short category description, one of which is shown in each category area, and a list of available content, herein described as articles. Two articles are displayed in content category area 72 as indicated by Article Description I and Article Description II. Associated with each article are a series of administrator-operable switches, typically in the form of computer screen radio buttons to the right of and in-line with each article description. Several switches are indicated generally at 80. One each of the operator switches are provided for functions associated with managing articles, in the illustrated embodiment labeled switches are provided for: editing the article, deleting the article, previewing the article, setting the position of the article, that is one button to raise the position within the associated category list and one button to lower the position whereby to affect the location of the article in the assembled communication, and enabling the article for inclusion within a communication. Articles that are not enabled will remain manageable on console 70 but will not be included in a subsequently generated communication.

Many different commercially available methods and systems are known in the art for creating console 70 and providing the described functionality, including but not limited to most conventional spreadsheet and database programs. It is desirable that publication management system 22 provide the functionality, through console 70, to add, edit, preview and otherwise work with all commercially known content formats and their processor-editors, including text editors, graphic editors, audio editors and video editors.

Continuing with reference to FIG. 4, content category area 72 is seen to include two articles while category area 74 includes one article, Article III Description, and category area 76 includes no articles. The upper left corner of operator screen 70 includes a switch labeled "Add New Content Category" which enables an administrator to create a new content area and insert a content description. Each of content category areas 72, 74 and 76 contain a switch labeled "Add Article" which enables an administrator to insert a new article within the content area, thereby establishing content for use in communications in accord with the various methods described herein.

Figure 5:
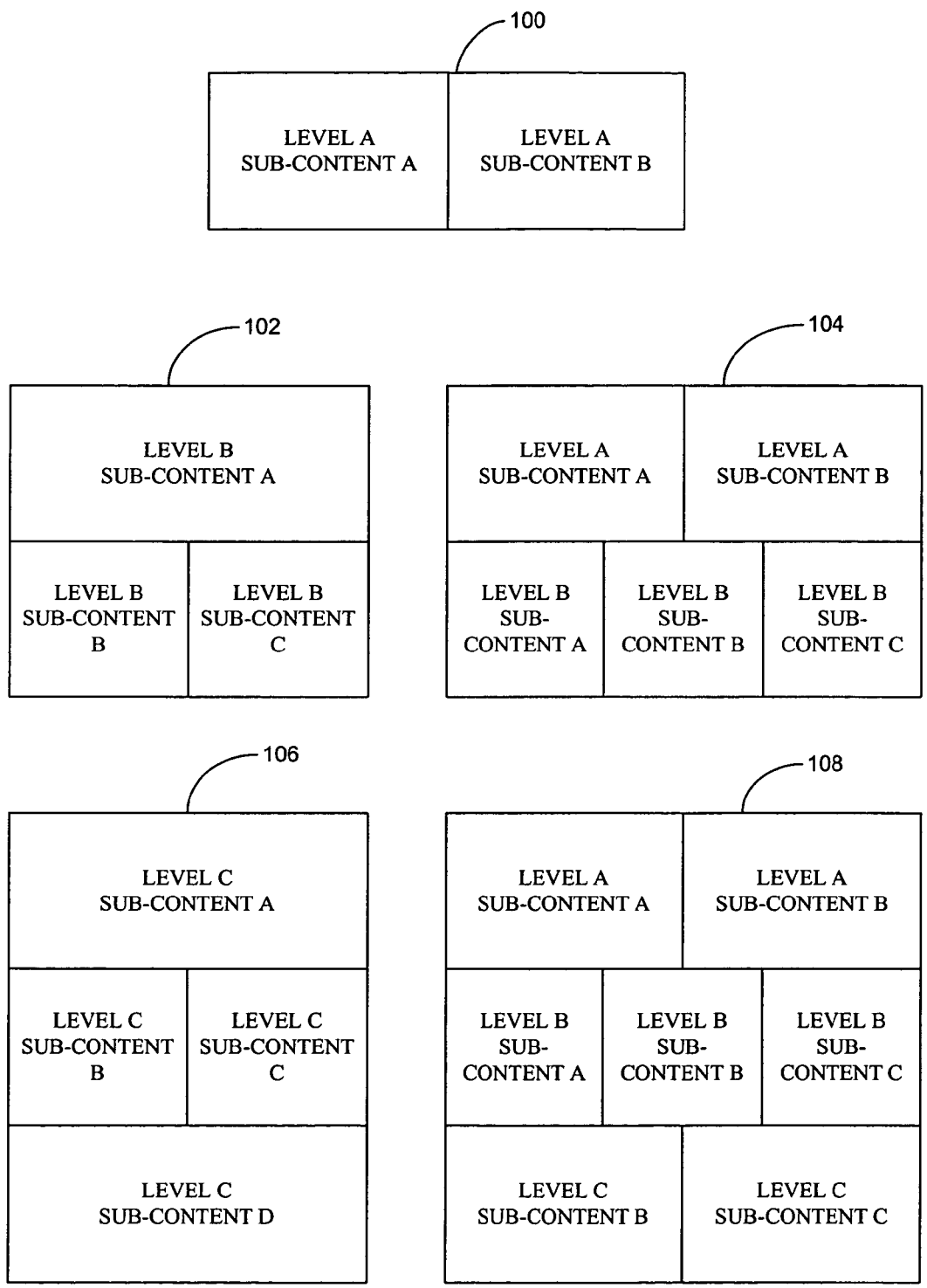
FIG. 5 is a block diagram illustrating a console management screen of a system administrator operable to assemble and distribute content.
Figure 6:
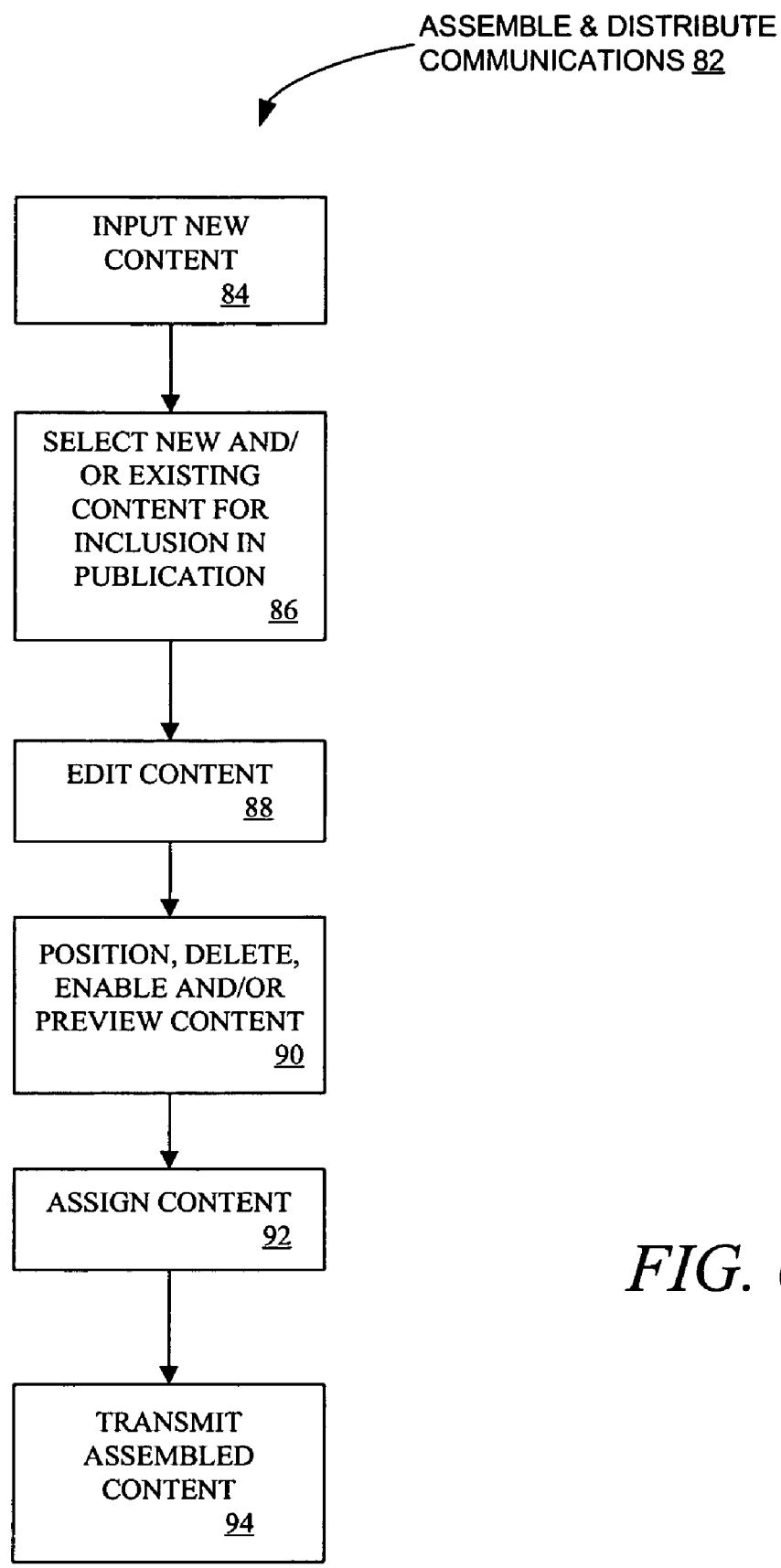
FIG. 6 is a flow chart illustrating a process of assembling and distributing content in accordance with the present invention.

With reference now to FIGS. 5 and 6, together with above-described FIGS. 3 and 4, a process 82 (FIG. 6) will now be described by which administrators can assemble and distribute communications. It will be recalled that an administrator has created and is managing a subscriber list (step 54 of FIG. 2) indicating recipients of communications.

To assemble and distribute communications to the subscribers, the administrator establishes local content for management through console 70. Any desired new content may be established by adding it into publication management system 22 using operator console 70 as described above (step 84). As noted above, content may be imported from content providers 36A–36N or created by an administrator. Further through the use of the 'Add New Content Category', 'Add Article' and 'enable' functions on console 70, the administrator selects from amongst newly added content and existing content for management and inclusion in a communication (step 86). As described elsewhere herein, existing content includes both content added by the administrator as well as content selected for his or her access by assignment of a global administrator.

With reference to FIG. 5, it will be seen that super administrator 42B has access only to content which they have entered into the system, identified herein as Level A content. It will be understood that Level A content may include many different types of sub-content, that is text, graphics, audio, video, etc. in many different formats, for example articles, pictures, audio files, video files, graphics, audio and video embedded in text, etc. Shown in FIG. 5 is an exemplary communication 100 assembled by super administrator 42B comprising two items: Level A, sub-content A and Level A, sub-content B, for example an article containing text and a graphical illustration.

Continuing with reference to FIG. 6, the administrator may again use the various switches on console 70 to edit content (step 88) as well as to position and/or delete and/or preview content (step 90). Super and global administrators may assign content available to him or her, that is the Level A content, to lower-level global and/or local administrators. This may be done, for example, through console 70 or through another operator screen designed to receive and associate assigned administrators with particular content. Further, super administrators have the ability to place content into pre-defined categories within pre-defined communications whereby to automatically assign and make such content available to all global and local administrators having access to such communications.

Once content is selected, assembled, positioned and otherwise edited into the desired communication such as an article, the communication is transmitted to the list of subscribers associated with the administrator (step 94). Many different methods can be used to facilitate this transmission, including but not limited to: i) providing a control screen by which the administrator who assembled the communication may initiate the transmission, and ii) providing a mechanism whereby the administrator may assign or request another party, such as the super administrator, to initiate the transmission. While in the described embodiment, the transmission is done electronically through e-mail, any other appropriate distribution method including but not hardcopy, radio-frequency or video-frequency transmission or others may be used. Subscribers may receive transmission on any appropriate reception device including but not limited to a computer terminal, mobile personal digital assistant, mobile phone, facsimile or other appropriate apparatus.

As discussed in detail above, a super administrator and all global administrators may assign content 'down' to other global and local administrators, selecting that content for distribution to and availability for use by the assigned administrators. Considering now a global administrator such as global administrators 42C and 42D, each may import or otherwise establish, in the manner described above, their own content, described herein as Level B content, the 'Level B' label indicating there is a higher level administrator in the publication management system hierarchy who may assign access to content down to level B administrators.

For purposes of illustration it is assumed that super administrator 42B has assigned access to Level A content to global administrator 42C but not to global administrator 42D. With reference back to FIG. 5, communication 102 is illustrative of a communication that can be assembled by global administrator 42D. With no access to Level A content, global administrator 42D may assemble a communication from Level B content only, communication 102 shown to include three content items Level B: sub-content A, sub-content B and sub-content C.

In comparison to global administrator 42D, global administrator 42C having access to Level A and his or her own Level B content, this global administrator may assemble a communication of the type shown at 104, including content items from both Level A and Level B content.

For purposes of further explanation, a similar assumption is made that global administrator C has assigned access to Level A and Level B content to global administrator 42F but not to local administrator 42G. With reference again to FIG. 5, communication 106 is illustrative of a communication that may be assembled and distributed by local administrator 42E. With no access assigned to Level A or Level B content, local administrator 42E may assemble communication 106 to contain only locally established, Level C content. In contrast to local administrator 42G, because global administrator 42F has been assigned access to both Level A and Level B content, this global administrator may create a communication such as that shown at 108, including content items from each of Levels A, B, and C.

It will be understood that super and global administrators may assign access to content 'down' to both global and local administrators by individual content item, content category, and/or the totality of a particular level of content.

From a consideration of the above, it will be seen that the present invention enables the hierarchical sharing of content between multiple levels of users, typically all of whom share a common interest in subject matter, across multiple organizations. As an example of a commercial implementation of the present invention, its use will now be illustrated in the creation of periodic newsletters for distribution by parties in the insurance industry. In such operation, publication management system 22 (FIG. 1) may be operated by an independent operator or by an insurance company. Entities 60 and 64 (FIG. 3) each comprise an independent insurance company such as State Farm or Mutual of Omaha or another. The global and local administrators within each entity 60 and 64 comprise various branch office agents and agent-managers.

To assemble a newsletter for use by the insurance agency, super administrator 42B will establish Level A articles of general interest in the insurance industry, generally assigning all customer-companies access to the Level A content. Level A content of particular interest only to one or several companies may only be assigned to those one or several companies.

Within each company, global administrators will establish Level B articles of general interest to all agents and of specific interest to specific agents, either procuring them from outside content providers 36A–36N or creating them themselves. Assigned access of both the Level A and Level B content will be provided to other global and local administrators as relevant. Access will be withheld from administrators to which the Level A and Level B content is not relevant. It will be understood that the establishment of new content and the assignment of new and higher-level content may continue downwards through an unlimited number of levels of global administrators within each organization. Local administrators may establish new content and selecte from assigned content, but may not assign content access to others.

Each insurance agent/administrator interested in sending a newsletter(s) to clients will, through selecting, assembling and editing assigned and/or locally established content, create a newsletter. Each agent may preview their completed newsletter and then initiate the transmission of that newsletter to their subscribers.

It will thus be seen that the present invention enables the sharing of articles of interest in a hierarchical manner across the entire insurance industry for purposes of assembling newsletters. The applicability of the invention to essentially limitless other industries or environments will now be apparent to the reader.

As noted above, various administrative functions are performed by various parties having access to publication management system 22. Administrative functions include: the management of subscriber lists, management of administrative accounts including identities and authorizations, updating and management of content, updating and management of various user screens and interfaces and other administrative functions as are pertinent to the operation of the publication management system.

It will be noted that there is generally centralized maintenance of data on publication management system 22, including administrator data, subscriber data and content. It will further be noted that the transmission of communications is handled through the publication management system. Because these functions are provided within publication management system 22, the invention provides the advantage of being able to track pertinent statistical data and generate reports for use by the administrators. In particular, the system provides the ability to track and report on, amongst other statistics: i) subscriber statistics, including new subscribers, terminated subscribers and total subscribers at any level within the system, ii) based on e-mail management, the number of times any given piece of content was reviewed, including the number of times it was viewed by any individual subscriber, and iii) statistics relating to the number and particular ones of undeliverable emails.

There has thus been provided new and improved methods and systems for managing the formation and transmission of communications that permits the establishment and sharing of content in a hierarchical environment, whereby various administrators can establish content for sharing with others 'below' them. The invention provides numerous tools including computer operations and user interfaces that facilitate the easy establishment of various user identities, authorizations and permissions. The invention further provides numerous tools facilitating the importation and sharing of content, the assembly of content into communications and the transmission of communications to parties on manageable subscriber lists. As has been described, the invention dramatically simplifies the efforts and costs associated with generating communications between business and customers across entire industries. The invention has substantial application in the communications industry.

While the invention has been shown and described with respect to particular embodiments, it is not thus limited. Numerous modifications, changes and improvements will now occur to the reader that fall within the scope of the claims.

What is claimed is:

1. A method operable on a computer for assembling communications for distribution to subscribers, comprising the steps of:
   establishing at least one level one administrator with the authorizations to
   establish a plurality of level two administrators,
   establish a plurality of level one content items, and identify from the plurality of level one content items distributed level one content items for distribution to level two administrators;

establishing, by the one level one administrator, at least one level two administrator, with the authorizations to
 establish a group of level two subscribers,
 establish a plurality of level two content items, and
 select from the plurality of level two content items and the distributed level one content items to assemble a communication for distribution to the level two subscribers; and assembling a communication, including editing, positioning and previewing the selected content items, for distribution to the level two subscribers.

2. The method of claim 1 wherein the level one administrator is further authorized to perform the steps of:
 establish a group of level one subscribers;
 select from the plurality of level one content items to assemble a communication for distribution to the level one subscribers.

3. The method of claim 1 wherein the level one administrator is further authorized to perform the step of establishing a plurality of other level one administrators.

4. The method of claim 1 wherein the authorization to establish a group of level two subscribers includes the authorizations to add new subscribers, delete old subscribers and update subscriber information.

5. The method of claim 1 wherein each of the authorizations of establishing a plurality of level one content items and establishing a plurality of level two content items includes the corresponding authorizations to add new content items and edit existing content items.

6. A method in accordance with claim 1 and further comprising the step of establishing a super administrator having the authorization to establish a plurality of level one administrators.

7. A system for assembling communications for distribution to subscribers, comprising:

a processor; and a memory operatively connected to the processor and storing instructions to control the operation of the processor to perform the steps of
 establish at least one level one administrator with the authorizations to
  establish a plurality of level two administrators,
  establish a plurality of level one content items, and
  identify from the plurality of level one content items distributed level one content items for distribution to level two administrators;
 establish, by the one level one administrator, at least one level two administrator, with the authorizations to
  establish a group of level two subscribers,
  establish a plurality of level two content items, and
  select from the plurality of level two content items and the distributed level one content items to assemble a communication for distribution to the level two subscribers; and
 assemble a communication, including editing, positioning and previewing the selected content items, for distribution to the level two subscribers.

\* \* \* \* \*

UNITED STATES PATENT AND TRADEMARK OFFICE
CERTIFICATE OF CORRECTION

PATENT NO. : 7,054,869 B1  Page 1 of 1
APPLICATION NO. : 10/744532
DATED : May 30, 2006
INVENTOR(S) : Roemke et al.

It is certified that error appears in the above-identified patent and that said Letters Patent is hereby corrected as shown below:

In column 1, line 39, delete "electromechanical" and insert - - electro-mechanical - -, therefor.

In column 1, line 62, delete "(PDAS)" and insert - - (PDAs) - -, therefor.

In column 6, line 22, delete "421" and insert - - 42I - -, therefor.

In column 6, line 60, delete "341" and insert - - 34I - -, therefor.

In column 9, line 62, delete "selecte" and insert - - selected - -, therefor.

Signed and Sealed this

First Day of August, 2006

JON W. DUDAS
*Director of the United States Patent and Trademark Office*